(12) United States Patent
Miwa (10) Patent No.: US 11,420,478 B2
(45) Date of Patent: Aug. 23, 2022

(54) TYRE

(71) Applicant: Sumitomo Rubber Industries, Ltd., Hyogo (JP)

(72) Inventor: Takuya Miwa, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 475 days.

(21) Appl. No.: 16/448,006

(22) Filed: Jun. 21, 2019

(65) Prior Publication Data

US 2020/0023687 A1   Jan. 23, 2020

(30) Foreign Application Priority Data

Jul. 19, 2018 (JP) .............................. JP2018-136029

(51) Int. Cl.
*B60C 11/11* (2006.01)
*B60C 11/13* (2006.01)

(52) U.S. Cl.
CPC ........... *B60C 11/11* (2013.01); *B60C 11/1376* (2013.01); *B60C 2200/10* (2013.01); *B60C 2200/14* (2013.01)

(58) Field of Classification Search
CPC . B60C 11/11; B60C 11/1376; B60C 2200/10; B60C 2200/14
See application file for complete search history.

(56) References Cited

U.S. PATENT DOCUMENTS

2016/0016437 A1*   1/2016   Ito ........................... B60C 11/11
152/209.15

FOREIGN PATENT DOCUMENTS

| EP | 2657048 A1 | 10/2013 |
|---|---|---|
| EP | 3056357 A1 | 8/2016 |
| JP | 2014213686 A | 11/2014 |
| JP | 2016060230 A | 4/2016 |
| JP | 2018-103673 A | 7/2018 |

OTHER PUBLICATIONS

The extended European search report issued by the European Patent Office dated Nov. 21, 2019, which corresponds to European Patent Application No. 19180581.1 and is related to U.S. Appl. No. 16/448,006.

* cited by examiner

*Primary Examiner* — Katelyn W Smith
*Assistant Examiner* — Philip N Schwartz
(74) *Attorney, Agent, or Firm* — Studebaker & Brackett PC (57) ABSTRACT

A tyre includes a tread portion including a groove bottom surface and a plurality of blocks protruding from the groove bottom surface. The plurality of blocks includes one or more multi-height blocks. Each multi-height block includes a first block portion having a first height from the groove bottom surface, a second block portion having a second height from the groove bottom surface, a third block portion having a third height from the groove bottom surface, and a block groove to define the first block portion, the second block portion and the third block portion. The second height is higher than the first height, and the third height is higher than the second height.

18 Claims, 8 Drawing Sheets

TYRE

BACKGROUND ART

Field of the Disclosure

The present disclosure relates to a tyre which includes a tread portion provided with a plurality of blocks.

Description of the Related Art

As tyres optimized for traveling on rough terrain, tyres which have tread portions provided with a plurality of blocks have been proposed. In such tyres, when traveling in mud terrain, a plurality of blocks can dig into mud terrain to improve edge effect of blocks, thus enabling to generate large traction and cornering force to improve steering stability.

For example, the following Patent document 1 discloses a tyre including at least one block which includes a first block portion, a second block portion having a height from a groove bottom surface and being smaller than that of the first block portion, and a first groove extending between the first block portion and the second block portion.

Patent Document

[Patent document 1] JP2018-103673A1

SUMMARY OF THE DISCLOSURE

However, according to recent improvement of driving performance of vehicle, demand of road adaptability for tyres has expanded and which brings that tyres have been required to exhibit excellent steering stability on every kinds of terrain. Thus, even in the tyre disclosed in Patent document 1, further improvement of steering stability has been expected.

The present disclosure has been made in view of the above circumstances and has a major object to provide a tyre capable of improving steering stability by increasing traction and cornering force.

According to one aspect of the disclosure, a tyre includes a tread portion including a groove bottom surface and a plurality of blocks protruding from the groove bottom surface, the plurality of blocks including one or more multi-height blocks, each multi-height block including a first block portion having a first height from the groove bottom surface, a second block portion having a second height from the groove bottom surface, a third block portion having a third height from the groove bottom surface, and a block groove to define the first block portion, the second block portion and the third block portion, wherein the second height is higher than the first height, and the third height is higher than the second height.

In another aspect of the disclosure, the third block portion may include a portion located outwardly in a tyre axial direction of the second block portion.

In another aspect of the disclosure, the first block portion may include a portion located on both sides in a tyre circumferential direction of the second block portion and the third block portion.

In another aspect of the disclosure, the first block portion may include a portion located inwardly in a tyre axial direction of the second block portion.

In another aspect of the disclosure, the block groove may include a first block groove extending between the first block portion and the second block portion, a second block groove extending between the first block portion and the third block portion, and a third block groove extending between the second block portion and the third block portion.

In another aspect of the disclosure, the second block portion may include a second outer edge located outwardly thereof in the tyre axial direction, and the second outer edge is chamfered.

In another aspect of the disclosure, the second block portion may include a second top surface located outwardly thereof in a normal direction to the groove bottom surface, and the second top surface has a pentagonal shape in which the second outer edge is dented inwardly in the tyre axial direction.

In another aspect of the disclosure, the third block portion includes a third inner block sidewall located inwardly thereof in the tyre axial direction, and the third inner block sidewall extends in a normal direction to the groove bottom surface.

In another aspect of the disclosure, the first block portion includes a first outer block sidewall located outwardly thereof in the tyre axial direction, the third block portion includes a third outer block sidewall located outwardly in the tyre axial direction, and the third outer block sidewall is located outwardly in the tyre axial direction of the first outer block sidewall.

In another aspect of the disclosure, a difference between the second height and the first height may be in a range of from 4% to 10% of the first height.

In another aspect of the disclosure, a difference between the third height and the first height is in a range of from 8% to 12% of the first height.

DESCRIPTION OF THE PREFERRED EMBODIMENTS

An embodiment of the present disclosure will be explained below with reference to the accompanying drawings.

Figure 1:
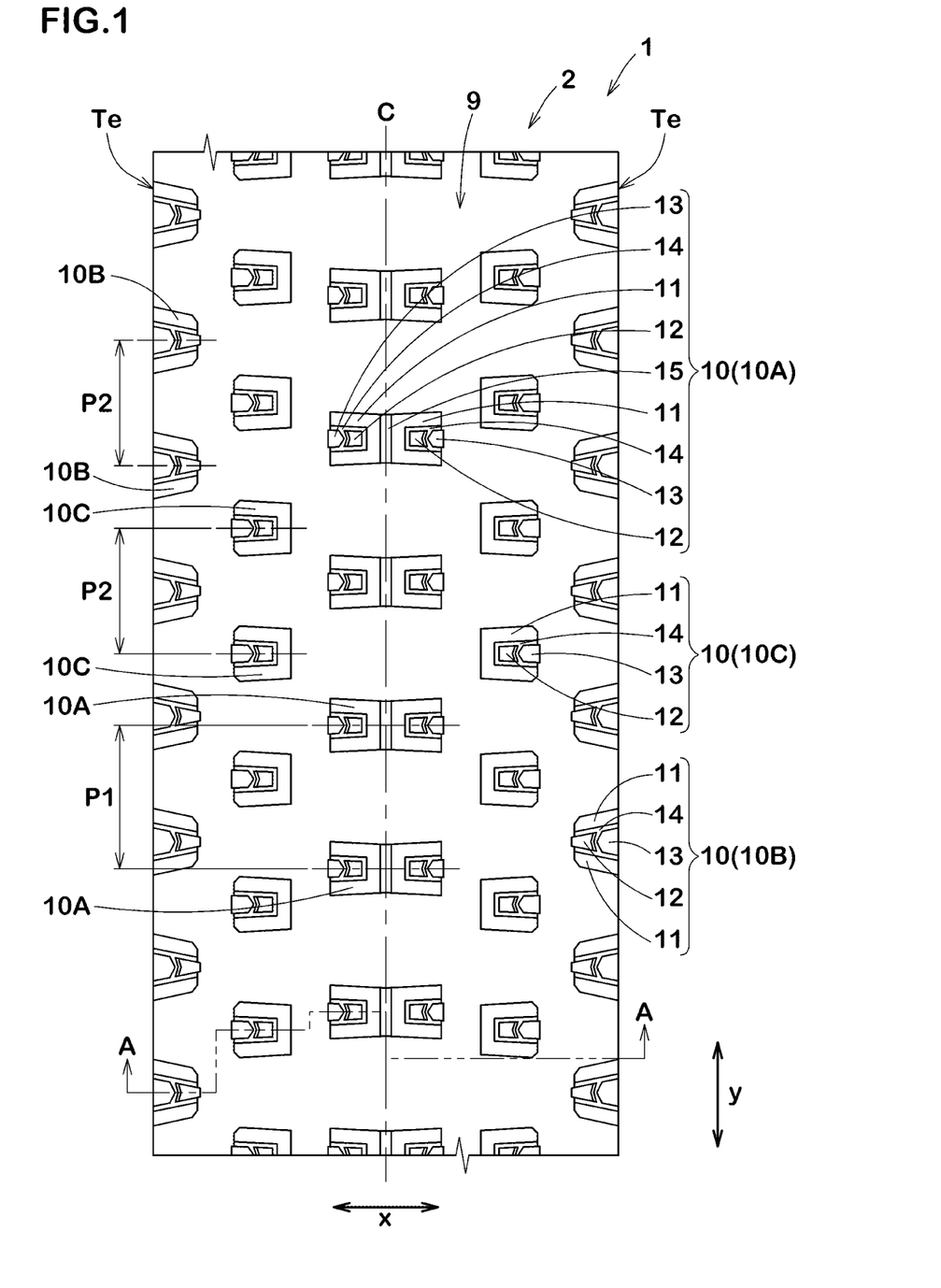
FIG. 1 is a development view of a tread portion of a tyre according to an embodiment of the disclosure.
Figure 2:
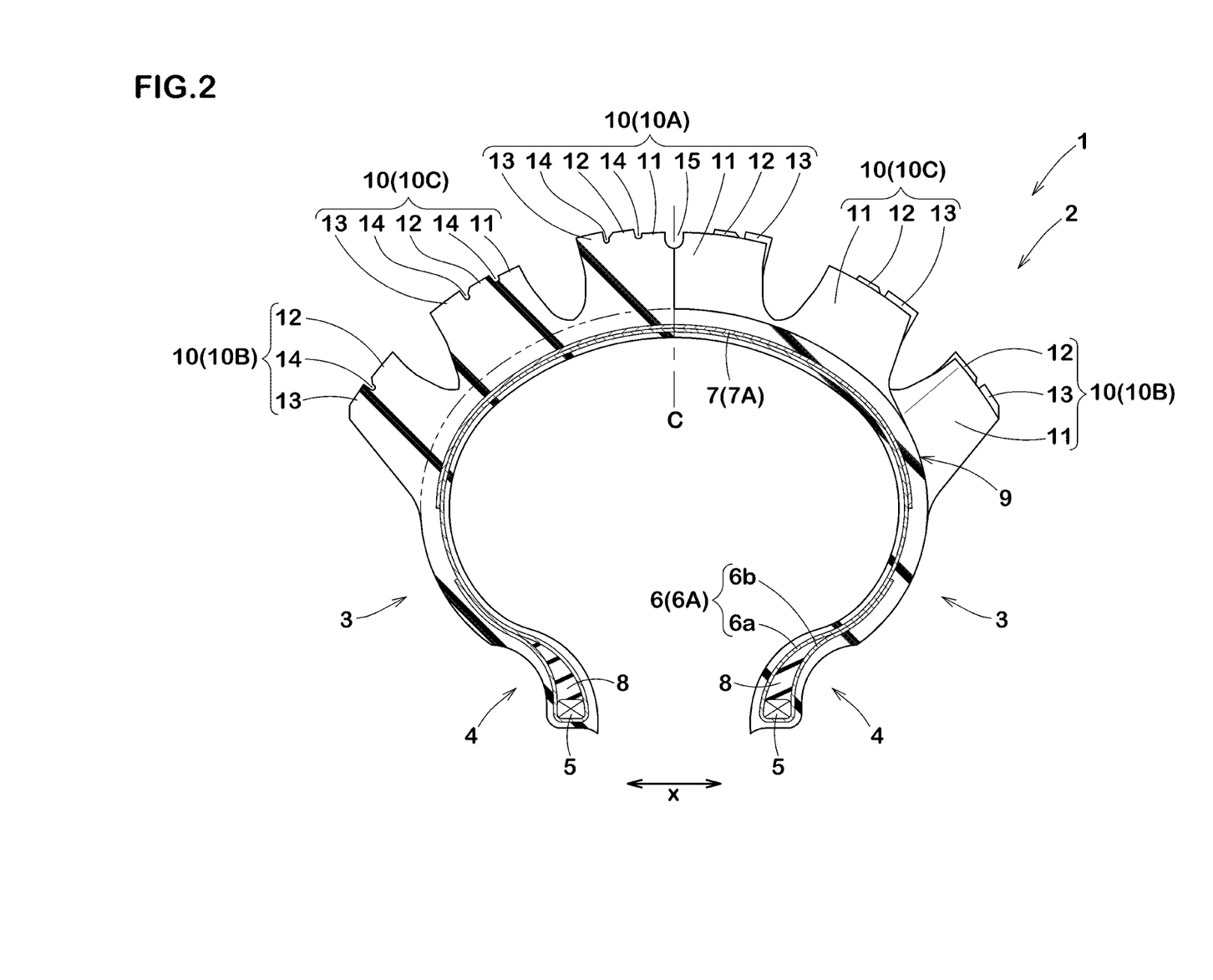
FIG. 2 is a cross-sectional view taken along line A-A of FIG. 1.

FIG. 1 is a development view of a tread portion 2 of a tyre 1 according to an embodiment of the disclosure, and FIG. 2 is a cross-sectional view of the tyre 1 under a normal state taken along line A-A of FIG. 1.

As illustrated in FIG. 1 and FIG. 2, the tyre 1, for example, is a motorcycle pneumatic tyre for traveling on rough terrain which is suitably used for motocross competition.

As used herein, the reference signs "x" and "y" represent the tyre axial direction and the tyre circumferential direction, respectively.

As used herein, the normal state is such that the tyre 1 is mounted on a standard wheel rim (not illustrated) with a standard pressure but is loaded with no tyre load. As used herein, dimensions of respective portions of the tyre 1 are values measured under the normal state unless otherwise noted.

The standard wheel rim is a wheel rim officially approved for each tyre by standards organizations on which the tyre 1 is based, wherein the standard wheel rim is the "standard rim" specified in JATMA, the "Design Rim" in TRA, and the "Measuring Rim" in ETRTO, for example.

The standard pressure is a standard pressure officially approved for each tyre by standards organizations on which the tyre 1 is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As illustrated in FIG. 2, the tyre 1 according to the present embodiment includes a carcass 6 extending between bead cores 5 disposed in respective bead portions 4 through the tread portion 2 and a pair of sidewall portions 3, and a belt layer 7 disposed on the carcass 6 within the tread portion 2.

In this embodiment, the carcass 6 includes at least one carcass ply 6A. The carcass ply 6A, for example, includes a plurality of carcass cords which are inclined at an angle with respect to the tyre circumferential direction y. As the carcass cords, a steel cord or an organic fiber cord (e.g., nylon, rayon, aramid and the like) can suitably be employed.

The carcass ply 6A includes a main portion 6a extending between bead cores 5 through the tread portion 2 and the pair of sidewall portions 3, and a pair of turned-up portions 6b each turned up around a respective one of the bead cores 5.

Preferably, a bead apex rubber 8 is disposed between the main portion 6a and a respective one of the pair of turned-up portions 6b in the respective bead portions 4. The bead apex rubber 8, for example, is made of hard rubber composition, thus enabling to enhance bead stiffness effectively.

In this embodiment, the belt layer 7 includes at least one belt ply 7A. The belt ply 7A, for example, includes belt cords (e.g., steel cords) arranged along the tyre circumferential direction y. Note that "along the tyre circumferential direction y" shall mean an aspect where the belt cords are arranged at an angle equal to or less than 5 degrees with respect to the tyre circumferential direction y. The belt layer 7 makes it possible to reduce tread deformation when traveling, thus improving durability of the tyre 1.

As illustrated in FIG. 1 and FIG. 2, in the tyre 1 according to the embodiment, the tread portion 2 includes a groove bottom surface 9 and a plurality of blocks 10 which protrudes from the groove bottom surface 9. The groove bottom surface 9, for example, is formed into an arc shape profile as shown in FIG. 2, preferably extending along a profile of the carcass 6. The tyre 1 as such may offer excellent transient characteristic which brings improved steering stability.

The plurality of blocks 10 includes one or more multi-height blocks. Preferably, each multi-height block includes a first block portion 11, a second block portion 12, a third block portion 13, and a block groove 14 defining the first block portion 11, the second block portion 12 and the third block portion 13. In this embodiment, all blocks 10 are configured as the multi-height blocks each of which includes the first block portion 11, the second block portion 12, the third block portion 13 and the block groove 14.

Figure 3:
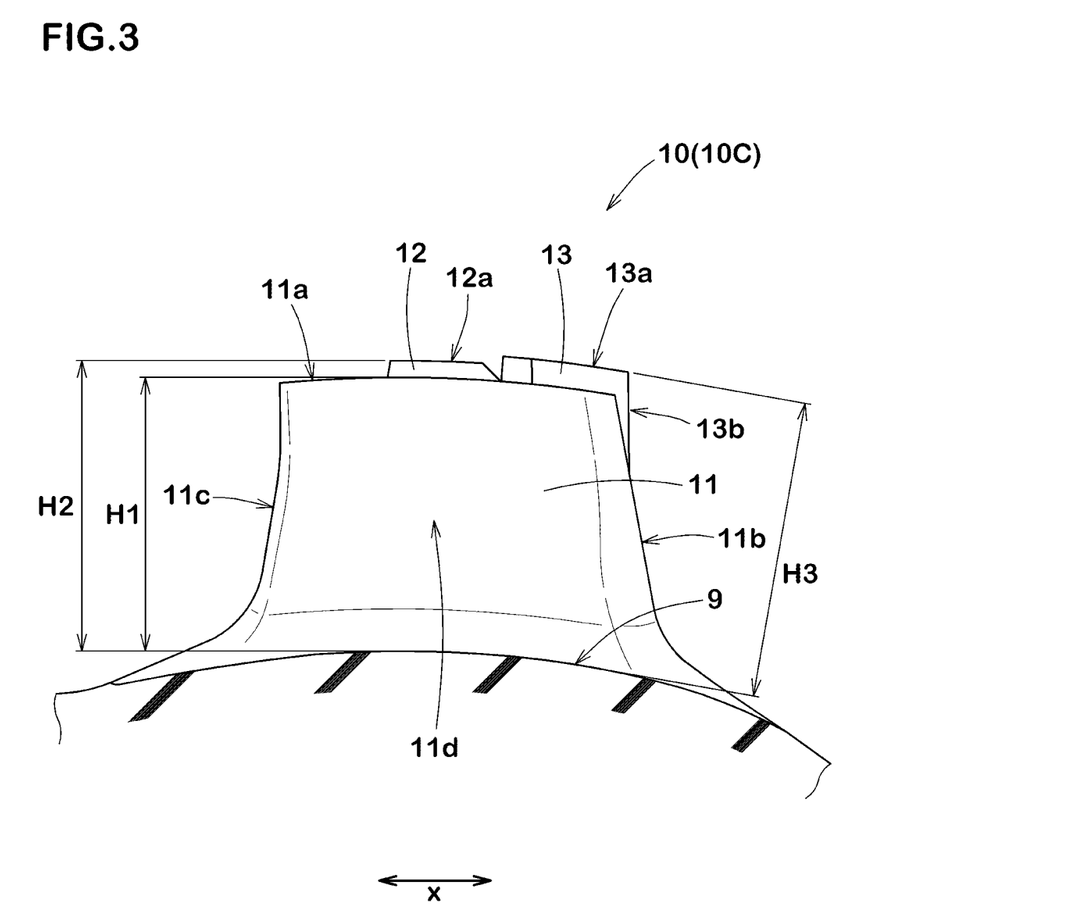
FIG. 3 is a partial enlarged view of FIG. 2.

FIG. 3 is a partial cross-sectional view of FIG. 2. As illustrated in FIG. 3, the first block portion 11, for example, has a first height H1 which is a height from the groove bottom surface 9. Preferably, the second block portion 12 has a second height H2 which is a height from the groove bottom surface 9, and the second height H2 is higher than the first height H1. In this embodiment, the third block portion 13 has a third height H3 which is a height from the groove bottom surface 9, and the third height H3 is higher than the second height H2.

Since such a multi-height block includes the first block portion 11, the second block portion 12 and the third block portion 13 which are different in height with one another, an edge length thereof which digs into mud terrain increases significantly when traveling in mud terrain, thus enabling to improve edge effect. Thus, the tyre 1 according to the embodiment can improve traction and cornering force in mud terrain, exerting excellent steering stability.

Further, since such a multi-height block is divided into the first block portion 11, the second block portion 12 and the third block portion 13 by the block groove 14, the block hardly deforms when traveling on a hard terrain, thus enabling to offer a large ground contact area. Thus, the tyre 1 according to the embodiment can improve traction and cornering force in hard terrain, exerting excellent steering stability.

Next, one or more preferable aspects of the tyre 1 in accordance with the present embodiment will be described below. Preferably, the difference between the second height H2 and the first height H1 is in a range of from 4% to 10% of the first height H1. When the difference between the second height H2 and the first height H1 is less than 4% of the first height H1, there is a risk that the second block portion 12 is prone to be short in protruding amount, and thus sufficient edge effect may not be exerted. When the difference between the second height H2 and the first height H1 exceeds 10% of the first height H1, there is a risk that stiffness of the second block portion 12 is prone to be low excessively, and thus sufficient edge effect may not be exerted.

Preferably, the difference between the third height H3 and the first height H1 is in a range of from 8% to 12% of the first height H1. When the difference between the third height H3 and the first height H1 is less than 8% of the first height H1, there is a risk that the third block portion 13 is prone to be short in protruding amount, and thus sufficient edge effect may not be exerted. When the difference between the third height H3 and the first height H1 exceeds 12% of the first height H, stiffness of the third block portion 13 is prone to be low excessively, and thus sufficient edge effect may not be exerted.

As illustrated in FIG. 1 and FIG. 2, in this embodiment, the blocks 10 include a row of crown blocks 10A arranged on and along the tyre equator C, and a pair of rows of shoulder blocks 10B arranged along respective tread edges Te. Further, the blocks 10 include a pair of rows of middle blocks 10C each arranged between the row of the crown blocks 10A and a respective one of the pair of rows of the shoulder blocks 10B.

As used herein, the tread edges Te shall mean respective outermost edges in the tyre axial direction x of top surfaces of the blocks which are located outermost in a normal direction to the groove bottom surface 9 of the tread portion 2. In this embodiment, the tread edges Te correspond to outermost edges in the tyre axial direction x of top surfaces of respective the shoulder blocks 10B. The tyre equator C is positioned in the center in the tyre axial direction x between the tread edges Te.

In this embodiment, each crown block 10A includes a pair of first block portions 11, a pair of second block portions 12, a pair of third block portions 13 and a pair of block grooves 14 defining the pair of first block portions 11, the pair of second block portions 12 and the pair of third block portions 13. The pair of first block portions 11, for example, is connected at the tyre equator C with each other. It is preferable that the pair of second block portions 12 and the pair of third block portions 13 are arranged in a line-symmetrical manner with respect to the tyre equator C.

Preferably, each crown block 10A is provided with a shallow groove 15 which extends along the tyre equator C. In this embodiment, the shallow grooves extend on and in parallel with the tyre equator C. That is, the shallow groove 15 is preferably located on a connected portion of the pair of first block portions 11. The crown blocks 10A, for example, are arranged in the tyre circumferential direction y with first pitches P1. The crown blocks 10A can improve traction and cornering force of the tyre 1 when straight traveling ahead as well as when beginning of cornering, thus enabling to improve steering stability of the tyre 1.

In this embodiment, each shoulder block 10B includes a pair of first block portion 11, a second block portion 12, a third block portion 13, and a block groove 14 defining the first block portion 11, the second block portion 12 and the third block portion 13. The pair of first block portions 11, for example, is located on both sides in the tyre circumferential direction y of the second block portion 12 and the third block portion 13. The pair of first block portions 11, for example, is located such that the second block portion 12 and the third block portion 13 are located between the pair of first blocks 11 in the tyre circumferential direction y.

Preferably, the shoulder blocks 10B are arranged in the tyre circumferential direction y with second pitches P2 which are smaller than the first pitches P1. The shoulder blocks 10B can improve traction and cornering force when steep cornering, thus enabling to improve steering stability of the tyre 1.

In this embodiment, each middle blocks 10C includes a first block portion 11, a second block portion 12, a third block portion 13, and a block groove 14 defining the first block portion 11, the second block portion 12 and the third block portion 13. In FIG. 3, one middle block 10C is illustrated.

The middle blocks 10C are arranged in the tyre circumferential direction y with the second pitches P2 which are smaller than the first pitches P1. The middle blocks 10C can improve traction and cornering force of the tyre 1 when cornering, thus enabling to improve steering stability of the tyre 1.

Figure 4:
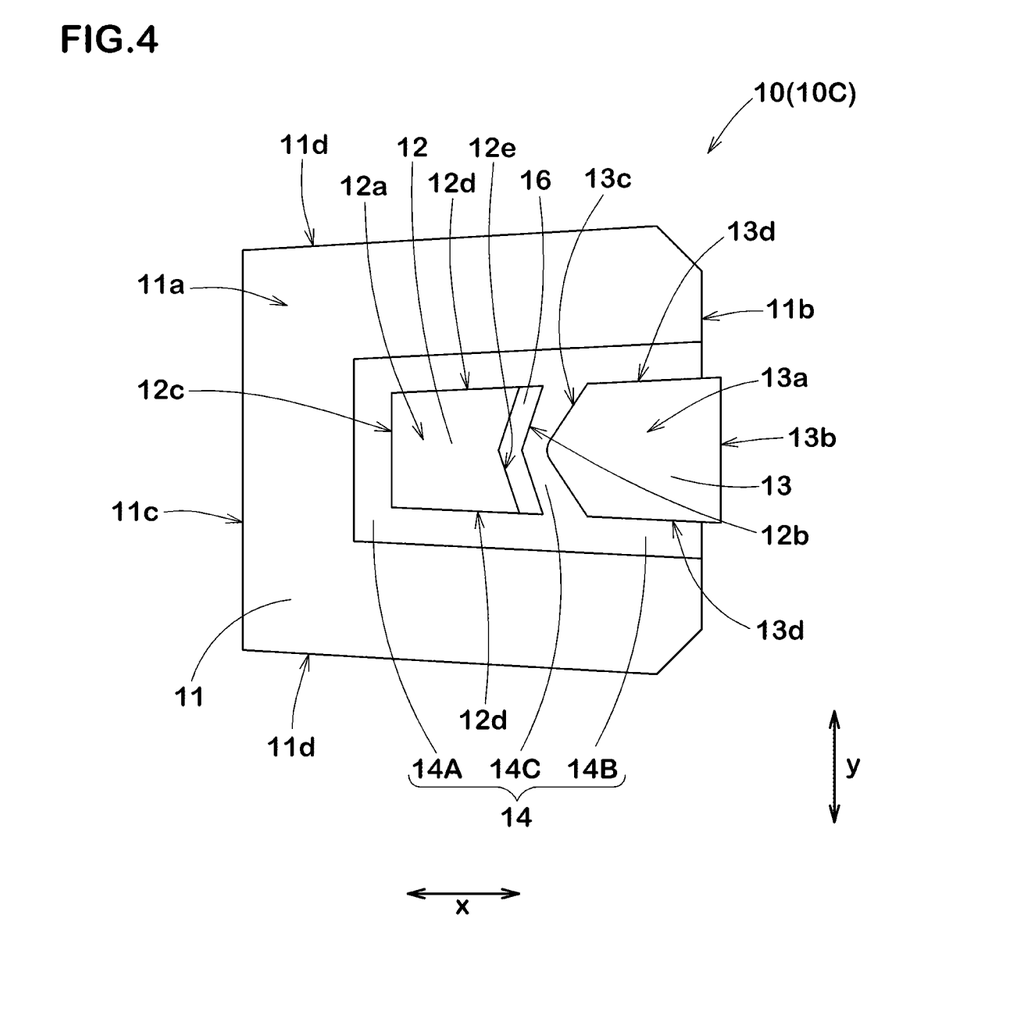
FIG. 4 is a partial enlarged view of FIG. 1.
Figure 5:
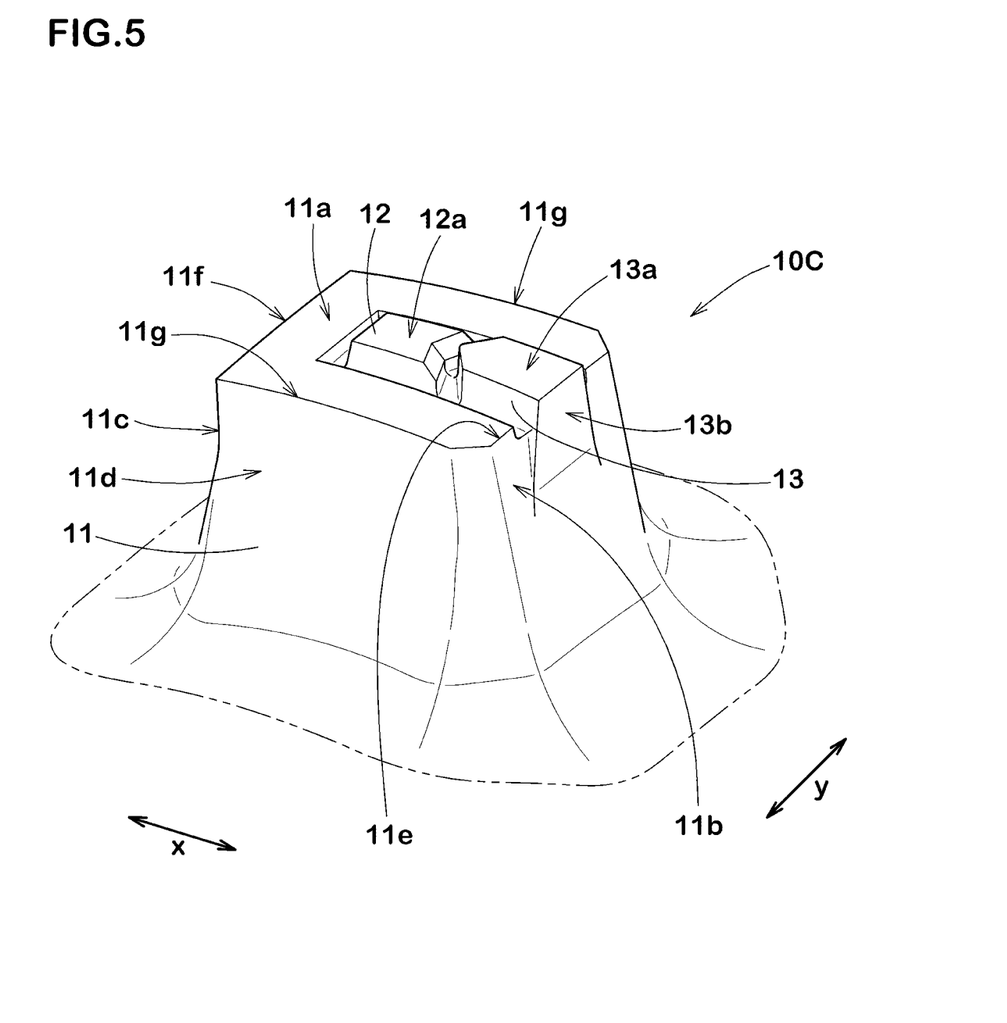
FIG. 5 is an enlarged perspective view of a middle block.

Next, the first block portion 11, the second block portion 12, the third block portion 13 and the block groove 14 will be described below using an example of one middle block 10C. FIG. 4 is a partial enlarged view of FIG. 1, and FIG. 5 is an enlarged perspective view of one middle block 10C. As illustrated in FIG. 3 to FIG. 5, the first block portion 11 according to the present embodiment includes a first top surface 11a located outwardly in a normal direction of the groove bottom surface 9. The above-mentioned first height H1 is a maximum height from the groove bottom surface 9 to the first top surface 11a.

The first block portion 11, in the present embodiment, includes a first outer block sidewall 11b located outwardly thereof in the tyre axial direction, a first inner block sidewall 11c located inwardly thereof in the tyre axial direction x, and a pair of lateral block sidewalls 11d forming the respective circumferential both ends of the block. The first block portion 11 can exhibit edge effect in both tyre axial direction x and tyre circumferential direction y in a well-balanced manner, thus enabling to improve traction and cornering force of the tyre 1.

As illustrated in FIG. 5, the first block portion 11, in this embodiment, includes a first outer edge 11e located outwardly in the tyre axial direction x of the first top surface 11a, a first inner edge 11f located inwardly in the tyre axial direction x of the first top surface 11a, and a pair of first lateral edges 11g located on respective both end sides in the tyre circumferential direction y of the top surface 11a. The first outer edge 11e is an edge where the first top surface 11a and the first outer block sidewall 11b cross with each other. The first inner edge 11f is an edge where the first top surface 11a and the first inner block sidewall 11c cross with each other. The respective first lateral edges 11g are edges where the first top surface 11a and a respective one of the first lateral block sidewalls 11d cross with each other.

Figure 6:
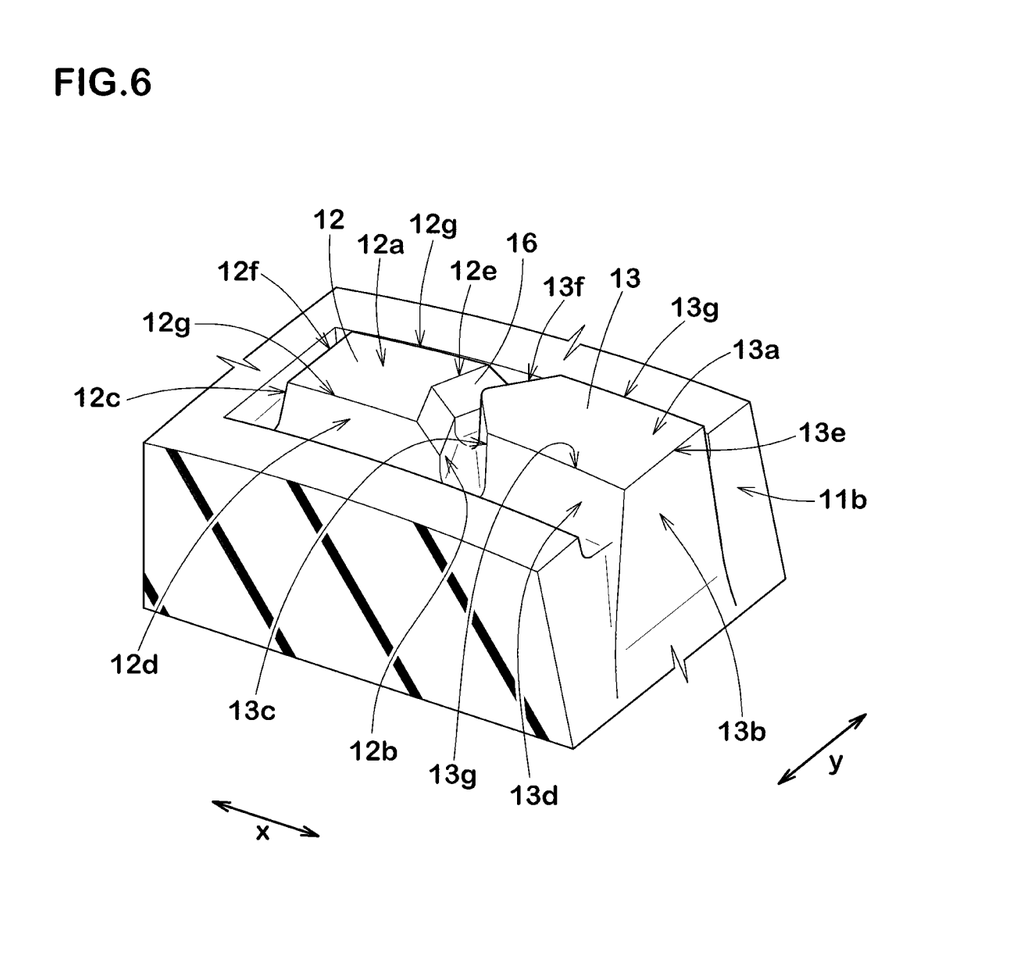
FIG. 6 is an enlarged perspective view of a second block portion and a third block portion.

FIG. 6 is an enlarged view of the second block portion 12 and the third block portion 13. As illustrated in FIG. 3 to FIG. 6, the second block portion 12, in the present embodiment, includes a second top surface 12a located outwardly thereof in a normal direction to the groove bottom surface 9. The above-mentioned second height H2 is a maximum height from the groove bottom surface 9 to the second top surface 12a.

As illustrated in FIG. 4 and FIG. 6, the second block portion 12 includes a second outer block sidewall 12b located outwardly thereof in the tyre axial direction, a second inner block sidewall 12c located inwardly thereof in the tyre axial direction x, and a pair of lateral block sidewalls 12d forming the respective circumferential both ends of the block. The second block portion 12 can exhibit edge effect in both tyre axial direction x and tyre circumferential direction y in a well-balanced manner, thus enabling to improve traction and cornering force of the tyre 1.

As illustrated in FIG. 6, the second block portion 12, in this embodiment, includes a second outer edge 12e located outwardly in the tyre axial direction x of the second top surface 12a, a second inner edge 12f located inwardly in the tyre axial direction x of the second top surface 12a, and a pair of second lateral edges 12g located on respective both end sides in the tyre circumferential direction y of the top surface 12a. The second inner edge 12f is an edge where the second top surface 12a and the second inner block sidewall 12c cross with each other. The respective second lateral edges 12g are edges where the second top surface 12a and a respective one of the second lateral block sidewalls 12d cross with each other. In the present embodiment, the second outer edge 12e is provided with a chamfered portion 16, and which will be described later specifically.

As illustrated in FIG. 3 to FIG. 6, the third block portion 13, in the present embodiment, includes a third top surface 13a located outwardly thereof in a normal direction to the groove bottom surface 9, the above-mentioned third height H3 is a maximum height from the groove bottom surface 9 to the third top surface 13a.

As illustrated in FIG. 4 and FIG. 6, the third block portion 13, in the present embodiment, includes a third outer block sidewall 13b located outwardly thereof in the tyre axial direction x, a third inner block sidewall 13c located inwardly thereof in the tyre axial direction x, and a pair of third lateral block sidewalls 13d located on respective both end sides in the tyre circumferential direction y of the block. The third block portion 13 can exhibit edge effect in both tyre axial direction x and tyre circumferential direction y in a well-balanced manner, thus enabling to improve traction and cornering force of the tyre 1.

Preferably, the third inner block sidewall 13c extends in a normal direction to the groove bottom surface 9. Such a third block portion 13 can exhibit high edge effect in the tyre axial direction x, thus enabling to improve cornering force of the tyre 1.

As illustrated in FIG. 6, the third block portion 13, in the present embodiment includes a third outer edge 13e located outwardly in the tyre axial direction x of the third top surface 13a, a third inner edge 13f located inwardly in the tyre axial direction x of the third top surface 13a, and a pair of third lateral edges 13g located on respective both end sides in the tyre circumferential direction y of the top surface 13a. The third outer edge 13e is an edge where the third top surface 13a and the third outer block sidewall 13b cross with each other. The third inner edge 13f is an edge where the third top surface 13a and the third inner block sidewall 13c cross with each other. The respective third lateral edges 13g are edges where the third top surface 13a and a respective one of the third lateral block sidewalls 13d cross with each other.

As illustrated in FIG. 3, FIG. 5 and FIG. 6, the third outer block sidewall 13b is located outwardly in the tyre axial direction x of the first outer block sidewall 11b. The third block portion 13 makes it possible to increase lengths of the third lateral edges 13g, thus enabling to exert high edge effect in the tyre circumferential direction y. Thus, the tyre 1 according to the embodiment can improve traction in mud terrain further, exerting excellent steering stability.

As illustrated in FIG. 4 and FIG. 5, it is preferable that the first block portion 11 includes a portion that is located on both sides in the tyre circumferential direction of the second block portion 12 and the third block portion 13. In the present embodiment, the first block portion 11 of each middle block 10C includes a portion that is located inwardly in the tyre axial direction x of the second block portion 12. Thus, the first top surface 11a of the first block portion 11 has a lateral U-shape. Such a first block portion 11 can exhibit edge effect in both tyre axial direction x and tyre circumferential direction y in a well-balanced manner, thus enabling to improve traction and cornering force of the tyre 1.

Preferably the second block portion 12 may be located between circumferentially spaced portions of the first block portion 11. The second block portion 12 of the middle blocks 10C, for example, is located between the first block portion 11 and the third block portion 13 in the tyre axial direction x.

Preferably, the third block portion 13 is located between circumferentially spaced portions of the first block portion 11. The third block portion 13, for example, includes a portion that is located outwardly in the tyre axial direction x of the second block portion 12. In the present embodiment, the entire third block portion 13 is located outwardly in the tyre axial direction x of the second block portion 12. The third block portion 13, upon side sliding, can offer high edge effect, thus enabling to improve steering stability of the tyre 1.

As illustrated in FIG. 4, the block groove 14, for example, includes a first block groove 14A, a second block groove 14B, and a third block groove 14C. In the present embodiment, the first block portion 11 and the second block portion 12 are divided by the first block groove 14A. Further, the first block portion 11 and the third block portion 13 are divided by the second block groove 14B. Furthermore, the second block portion 12 and the third block portion 13 are divided by the third block groove 14C.

Preferably, the first block groove 14A, the second block groove 14B and the third block groove 14C have the same depth as with each other from the first top surface 11a of the first block portion 11. Such a block groove 14 makes it possible to optimize stiffness of the second block portion 12 and the third block portion 13, thus enabling to improve traction and cornering force of the tyre 1 on hard terrain.

As illustrated in FIG. 4 and FIG. 6, in the present embodiment, the second top surface 12a of the second block portion 12 has a pentagonal shape in which the second outer edge 12e is dented inwardly in the tyre axial direction x. Further, the third top surface 13a of the third block portion 13 has a pentagonal shape in which the third inner edge 13f protrudes inwardly in the tyre axial direction x. In the present embodiment, the third inner edge 13f extends in substantially parallel with the second outer edge 12e. Such a second block portion 12 and the third block portion 13 can exhibit edge effect in both tyre axial direction x and tyre circumferential direction y in a well-balanced manner, thus enabling to improve traction and cornering force of the tyre 1.

In the present embodiment, the chamfered portion 16 is formed along the third block groove 14C. The chamfered portion 16 makes it possible to provide large void between the second block portion 12 and the third block portion 13, thus enabling to prevent the third block groove 14C from being clogged by soil, mud and the like. In addition, the void enlarged by the chamfered portion 16 makes it possible to improve edge effect of the third inner block sidewall 13c of the third block portion 13, thus enabling to improve cornering performance of the tyre further.

Figure 7:
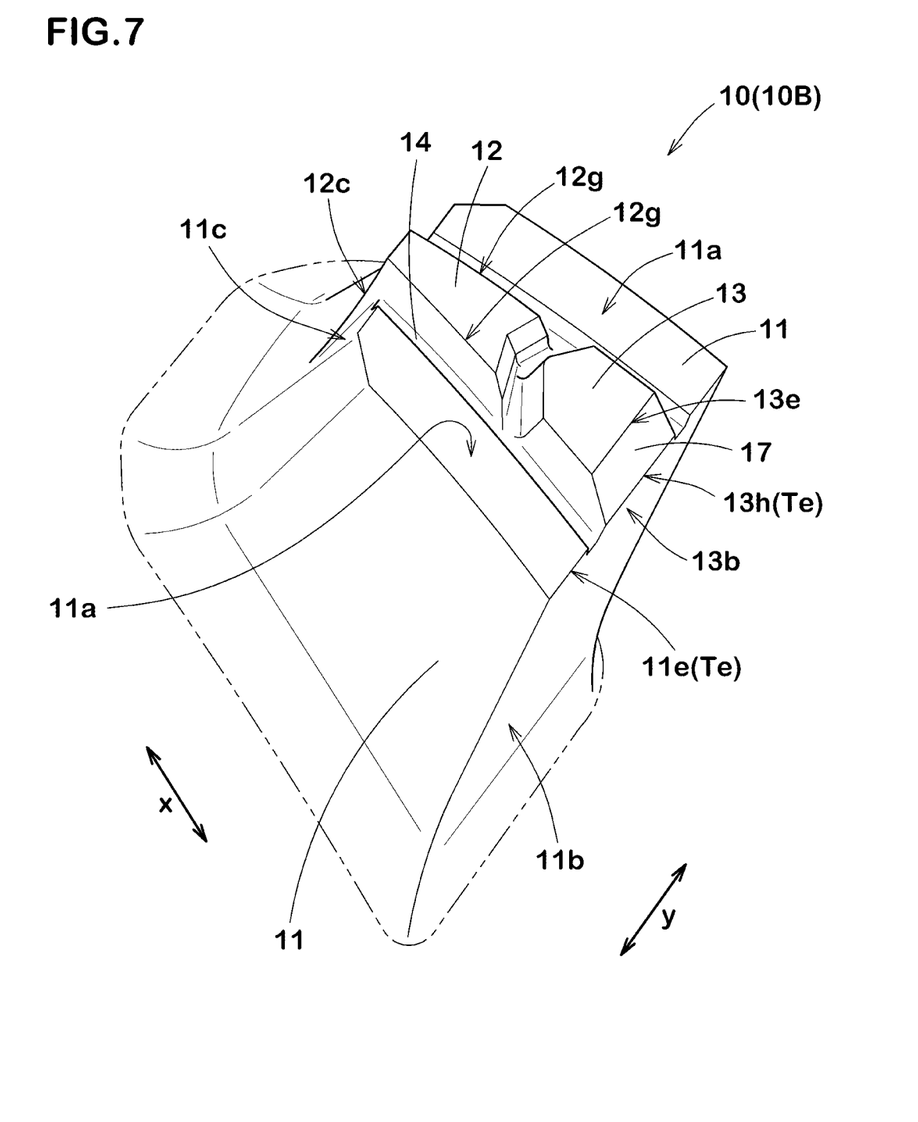
FIG. 7 is an enlarged perspective view of a shoulder block.

Next, as to the shoulder blocks 10B, some points which differ from the above-mentioned middle blocks 10C will be described below. FIG. 7 is an enlarged perspective view of one shoulder block 10B. As illustrated in FIG. 7, in the present embodiment, the pair of first block portions 11 of each shoulder block 10B has a respective one of independent first top surfaces 11a which are not connected with each other. That is, each shoulder block 10B does not include a portion that is located inwardly in the tyre axial direction x of the second block portion 12 to connect the pair of first block portions 11. Thus, the block grooves 14 provided on each shoulder block 10B traverse the shoulder blocks 10B in the tyre axial direction x completely.

In the present embodiment, the second inner block sidewall 12c is located inwardly in the tyre axial direction x of the first inner block sidewall 11c in each shoulder block 10B. Such a second block portion 12 makes it possible to expand lengths of the second lateral edges 12g, thus enabling to exhibit high edge effect in the tyre circumferential direction y. Thus, the tyre 1 according to the embodiment can improve traction on soft ground terrain further, exhibiting excellent steering stability.

In the present embodiment, the third outer block sidewall 13b forms the same or substantially same plane as the first outer block sidewall 11b in each shoulder blocks 10B. Preferably, each shoulder block 10B is provided with an outer chamfered portion 17 on the third outer edge 13e. In the present embodiment, the third block sidewall edge 13h where the third outer block sidewall 13b and the outer chamfered portion 17 cross with each other defines the tread edges Te together with the first outer edge 11e. The shoulder blocks 10B, when steep cornering, makes it possible not only to improve traction and cornering force but also to stabilize motion of the tyre, thus improving steering stability of the tyre 1.

Figure 8:
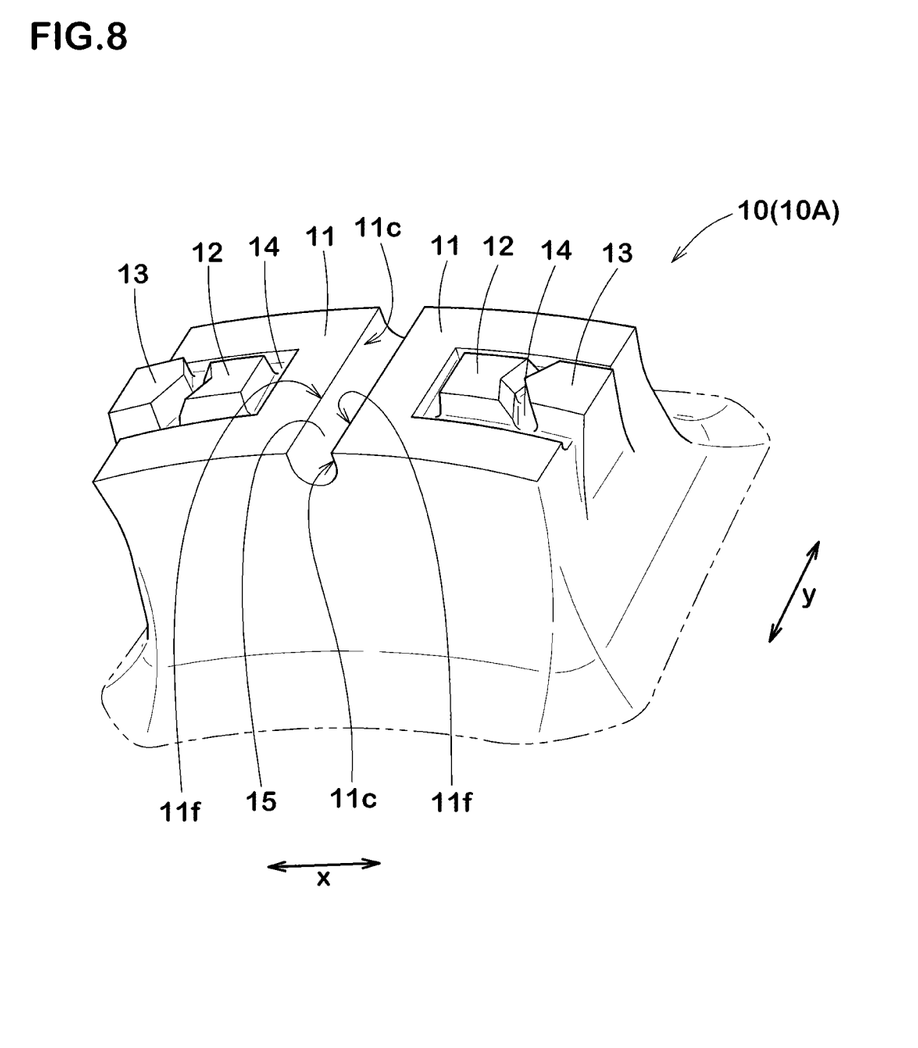
FIG. 8 is an enlarged perspective view of a crown block.

Next, as to the crown blocks 10A, some points which differ from the above-mentioned middle blocks 10C will be described below. FIG. 8 illustrates an enlarged perspective view of one crown block 10A. As illustrated in FIG. 8, in the present embodiment, the shallow groove 15 provided on each crown block 10A defines the pair of first inner block sidewalls 11c as well as the pair of first inner edges 11f of the pair of first block portions 11. The shallow groove 15 makes it possible to improve edge effect in the tyre axial direction x, thus enabling to improve cornering force of the tyre 1 at beginning of cornering.

Preferably, the shallow groove 15 has a groove width and a groove depth which are greater than a groove width and a groove depth of the block grooves 14. Such a shallow groove 15 can optimize stiffness of the crown block 10A, thus enabling to provide a large ground contact area of the crown block 10A on hard ground terrain. Note that the pair of first block portions 11, the pair of second block portions 12 and the pair of third block portions 13 are the same as configurations of the above-mentioned middle blocks 10C.

While the particularly preferable embodiments in accordance with the present disclosure have been described in detail, the present disclosure is not limited to the illustrated embodiments, but can be modified and carried out in various aspects.

Example

Tyres having the tread pattern shown in FIG. 1 as well as a basic structure shown in FIG. 2 were prototyped based on the detail shown in Table 1. Then, traction and cornering performance of each test tyres was tested. The common specification and the test method are as follows.
Common Specification:
  Test vehicle: motocross bike with 450 cc displacement
  Tyre location: rear
  Tyre size: 120/90-19
  Rim size: 2.15×19
  Tyre inner pressure: 80 kPa
  Test course: rough terrain including both soft and hard conditions
Traction and Cornering Performance Test:

A test rider drove the vehicle equipped with a respective one of the test tyres on the test course, and then evaluated traction and cornering performance based on rider's sense. The test results are shown in Table 1 using a 10-grade score system. The larger value indicates better traction and cornering performance.

Table 1 shows the test results.

TABLE 1

|  | Ref. 1 | Ref. 2 | Ref. 3 | Ex. 1 | Ex. 2 | Ex. 3 |
| --- | --- | --- | --- | --- | --- | --- |
| Second block portion | none | presence | presence | presence | presence | presence |
| Third block portion | none | none | presence | presence | presence | presence |
| (Second height − first height)/first height (%) | — | 5 | 8 | 5 | 8 | 5 |
| (Third height − first height)/first height (%) | — | — | 8 | 9 | 12 | 9 |
| Chamfered portion | — | — | none | presence | presence | none |
| traction (score) | 3 | 5 | 6 | 10 | 8 | 9 |
| Cornering performance (score) | 3 | 5 | 5 | 10 | 8 | 7 |

From the test results, it is confirmed that the example tyres improve traction and cornering performance as compared to the comparative examples.

What is claimed is:

1. A tyre comprising:
    a tread portion comprising a groove bottom surface and a plurality of blocks protruding from the groove bottom surface,
    the plurality of blocks comprising one or more multi-height blocks,
    each multi-height block comprising a first block portion having a first height from the groove bottom surface, a second block portion having a second height from the groove bottom surface, a third block portion having a third height from the groove bottom surface, and a block groove to define the first block portion, the second block portion and the third block portion, wherein
    the second height is higher than the first height,
    the third height is higher than the second height,
    the block groove is directly adjacent to the first, second and third block portions,
    the block groove comprises a first block groove extending between the first block portion and the second block portion,
    a second block groove extending between the first block portion and the third block portion, and
    a third block groove extending between the second block portion and the third block portion.

2. The tyre according to claim 1, wherein the third block portion comprises a portion located outwardly in a tyre axial direction of the second block portion.

3. The tyre according to claim 1, wherein the first block portion comprises portions located on both sides in a tyre circumferential direction of the second block portion and the third block portion.

4. The tyre according to claim 1, wherein the first block portion comprises a portion located inwardly in a tyre axial direction of the second block portion.

5. The tyre according to claim 1, wherein the second block portion comprises a second outer edge located outwardly thereof in the tyre axial direction, and the second outer edge is chamfered.

6. The tyre according to claim 5, wherein the second block portion comprises a second top surface located outwardly thereof in a normal direction to the groove bottom surface, and the second top surface has a pentagonal shape in which the second outer edge is dented inwardly in the tyre axial direction.

7. The tyre according to claim 1, wherein the third block portion comprises a third inner block sidewall located inwardly thereof in the tyre axial direction, and the third inner block sidewall extends in a normal direction to the groove bottom surface.

8. The tyre according to claim 1, wherein the first block portion comprises a first outer block sidewall located outwardly thereof in the tyre axial direction, the third block portion comprises a third outer block sidewall located outwardly in the tyre axial direction, and the third outer block sidewall is located outwardly in the tyre axial direction of the first outer block sidewall.

9. The tyre according to claim 1, wherein
a difference between the second height and the first height is in a range of from 4% to 10% of the first height.

10. The tyre according to claim 1, wherein
a difference between the third height and the first height is in a range of from 8% to 12% of the first height.

11. The tyre according to claim 7, wherein
the third block portion has a third inner edge where the third inner block sidewall and a top surface of the third block portion cross with each other, and the third inner edge protrudes inwardly in the tyre axial direction so as to form a lateral V-shape.

12. The tyre according to claim 11, wherein
the top surface of the third block portion has a pentagonal shape.

13. The tyre according to claim 1, wherein
the third block portion is located outwardly in a tyre axial direction of the second block portion, and
the first block portion comprises circumferentially spaced portions located on both sides in a tyre circumferential direction of the second block portion and the third block portion.

14. The tyre according to claim 11, wherein
the third block portion is located outwardly in a tyre axial direction of the second block portion, and
the first block portion comprises circumferentially spaced portions located on both sides in a tyre circumferential direction of the second block portion and the third block portion.

15. The tyre according to claim 13, wherein
the circumferentially spaced portions of the first block portion are connected with each other by a portion located inwardly in the tyre axial direction of the second block portion.

16. The tyre according to claim 14, wherein
the circumferentially spaced portions of the first block portion are connected with each other by a portion located inwardly in the tyre axial direction of the second block portion.

17. A tyre comprising:
a tread portion comprising a groove bottom surface and a plurality of blocks protruding from the groove bottom surface,
the plurality of blocks comprising one or more multi-height blocks,
each multi-height block comprising a first block portion having a first height from the groove bottom surface, a second block portion having a second height from the groove bottom surface, a third block portion having a third height from the groove bottom surface, and a block groove to define the first block portion, the second block portion and the third block portion, wherein
the second height is higher than the first height,
the third height is higher than the second height,
the block groove is directly adjacent to the first, second and third block portions, and
the second block portion comprises a second outer edge located outwardly thereof in the tyre axial direction, and the second outer edge is chamfered.

18. A tyre comprising:
a tread portion comprising a groove bottom surface and a plurality of blocks protruding from the groove bottom surface,
the plurality of blocks comprising one or more multi-height blocks,
each multi-height block comprising a first block portion having a first height from the groove bottom surface, a second block portion having a second height from the groove bottom surface, a third block portion having a third height from the groove bottom surface, and a block groove to define the first block portion, the second block portion and the third block portion, wherein
the second height is higher than the first height,
the third height is higher than the second height,
the block groove is directly adjacent to the first, second and third block portions,
the third block portion is located outwardly in a tyre axial direction of the second block portion, and
the first block portion comprises circumferentially spaced portions located on both sides in a tyre circumferential direction of the second block portion and the third block portion.

* * * * *